United States Patent [19]
Nishimura et al.

[11] Patent Number: 5,670,186
[45] Date of Patent: Sep. 23, 1997

[54] INJECTION MOLDING MACHINE PROVIDED MOLDING WITH A DISPLAY UNIT

[75] Inventors: Koichi Nishimura, Yamanashi; Hideki Koyama, Fujiyoshida; Hiroko Yoshida; Susumu Ito, both of Yamanashi, all of Japan

[73] Assignee: Fanuc Ltd., Yamanashi, Japan

[21] Appl. No.: 530,306

[22] PCT Filed: Jan. 27, 1995

[86] PCT No.: PCT/JP95/00101

§ 371 Date: Oct. 3, 1995

§ 102(e) Date: Oct. 3, 1995

[87] PCT Pub. No.: WO95/23059

PCT Pub. Date: Aug. 31, 1995

[30] Foreign Application Priority Data

Feb. 24, 1994 [JP] Japan ................... 6-049977

[51] Int. Cl.[6] ........................... B29C 45/84
[52] U.S. Cl. ............ 425/151; 425/169; 425/574; 425/DIG. 45
[58] Field of Search ................... 425/151, 169, 425/574, DIG. 45

[56] References Cited

U.S. PATENT DOCUMENTS

| | | | |
|---|---|---|---|
| 3,728,057 | 4/1973 | Grundmann et al. | 425/151 |
| 4,775,309 | 10/1988 | Hehl . | |
| 4,976,598 | 12/1990 | Hehl . | |
| 5,310,332 | 5/1994 | Ito et al. | 425/169 |

FOREIGN PATENT DOCUMENTS

| | | |
|---|---|---|
| A-0 264 601 | 4/1988 | European Pat. Off. . |
| C-38 11 298 | 9/1989 | Germany . |
| U-61-87914 | 6/1986 | Japan . |
| U-2-86720 | 7/1990 | Japan . |
| A2-238916 | 9/1990 | Japan . |
| Y2-5-38903 | 10/1993 | Japan . |

*Primary Examiner*—Tim Heitbrink
*Attorney, Agent, or Firm*—Staas & Halsey

[57] ABSTRACT

An injection molding machine provided with an easy-to-operate and space-saving display unit, a clamping unit and an injection unit arranged laterally. The display unit is installed on an injection-side gate enclosing the injection unit. The display unit is movable as the injection-side gate is opened or closed, to simultaneously observe both the mold clamping-side gate and the display unit. Alternatively, the display unit is installed on an injection-side gate enclosing the clamping unit.

8 Claims, 4 Drawing Sheets

FIG. I

INJECTION MOLDING MACHINE PROVIDED MOLDING WITH A DISPLAY UNIT

BACKGROUND OF THE INVENTION

1. Field of the Invention

The present invention relates to an injection molding machine provided with a display unit for displaying data such as an operation state of the machine.

2. Description of the Prior Art

A motor-driven injection molding machine using an NC unit sets various data values, interprets and monitors operation states, and displays a message for transfer of an alarm on a display unit such as a CRT. Moreover, the display unit is provided with a manual data input (MDI) so that an operator can easily set a value while viewing the screen. Therefore, a display unit set on an injection molding machine is not only important in performing injection molding operations but also is required to be easy for the operator to use.

Stand-type, built-in-type, and pendant-type display units, etc., for example, are known as existing display units used for injection molding machines.

The stand-type display unit consists of a display unit mounted on the top of a stand erected on a floor. The built-in-type display unit is designed so that its display section can be stored in the space in the base of an injection molding machine. The pendant-type display unit is disclosed, for example, in the official gazette of Japanese Patent Application KOKAI 83-107534 Laid-Open, which is designed so that the display section of the unit can be hung on the front end of a horizontally rotatable arm. With this structure, the display unit can be retracted into the space provided at the top of an injection molding machine when it is not needed and pulled out when it is needed.

However, existing display units for an injection molding machine have the following problems. For example, the stand-type display unit has a problem that the display unit requires a large space because the unit projects around the machine and is always present on a floor. Another problem is that the standing type display unit sometimes hinders the movement of the operator or the conveyance of the materials.

The pendant-type display unit has a problem that the display unit requires a large space because the unit is designed so as to protrude to the outside of an injection molding machine. Moreover, as the display section is hung, a rotary arm must be set at a higher level corresponding to the vertical dimension of the display section, and the length of the rotary arm needs to be limited so that the rotary arm, as a cantilever, remains capable of supporting a heavy display unit at its front end, and thus the distance between the operating position and retracted position for the display unit is not necessarily adequate. Furthermore, since it is necessary to prevent the display section from colliding with any of the members of the injection molding machine during rotation, the screen is inevitably required to be located at a position higher than the normal level of the eyes of an operator and so, it is inconvenient for the operator to turn its eyes from the operating panel located on the side of the injection molding machine to the display screen located almost in front or a little below the front to the display screen, and this poses a problem in view of the facility of operation.

In the case of the built-in-type display unit, the display section is installed at the base side of an injection molding machine. Therefore, there is a difference in height between the display section and the molding section, and so when an operator looks at the injection molding machine directing his eyes almost straightforward, the position of the screen is lower than the level of his eyes, and thus this is inconvenient for the operator to set data or interpret and monitor an operating state.

Also, it is possible to install the display unit inside the fixed-plate cover. However, in most instances, the fixed-plate cover has a small width. Therefore, the allowable size of a display unit for installation is limited, and thus only a small-size display unit is installable.

SUMMARY OF THE INVENTION

There is an increasing demand for large-size display units in order to cope with the increasing volume and complexity of the information to be displayed. Therefore, to meet such a requirement, a structure large enough to contain a large display unit is proposed. The result of the study of such structure, however, indicates that the structure has disadvantages such that the retracting stroke of the injection unit needs to be increased in order to draw a cylinder assembly out of an injection cover by rotating it when replacing a screw, and that the injection molding machine it self will become to occupy a larger space.

Therefore, it is an object of the present invention to provide an injection molding machine having an easy-to-operate and space-saving display unit.

The present invention achieves the above object by using an injection molding machine in which a clamping unit and an injection unit are laterally arranged, installing a display unit on an injection-side gate enclosing the injection unit, and making the display unit movable as the injection-side gate opens or closes.

Moreover, the present invention achieves the above object by using an injection molding machine in which a clamping unit and an injection unit are laterally arranged, installing a display unit on a mold clamping-side gate enclosing the mold clamping unit.

The display unit of the present invention has at least a display screen having a function for displaying various pieces of information related to operations of an injection molding machine. The means for performing such display function may be of CRT, liquid crystal display, or plasma display. Furthermore, the display unit may be provided with an input means in addition to the display screen.

Furthermore, it is possible to install the display unit on the mold clamping unit side of the injection-side gate or to install the display unit on the injection unit side of the mold clamping-side gate.

In the case of the present invention, an injection molding machine is used in which a clamping unit and an injection unit are laterally arranged and a display unit is installed on an injection-side gate enclosing the injection unit. When the injection-side gate is opened, the display unit moves so as to go away from the mold clamping-side gate together with the injection-side gate, the cylinder assembly of the injection unit becomes rotatable, and operations including screw replacement becomes operable. However, when closing the injection-side gate, the display unit moves toward the mold clamping-side gate together with the injection-side gate, and the screen of the display unit is arranged at a position adjacent to windows of the injection-side and mold clamping-side gates.

Moreover, in the case of the present invention, an injection molding machine is used in which a clamping unit and an injection unit are laterally arranged, and a display unit is installed on a mold clamping-side gate enclosing an injection unit. When the injection-side gate is opened, only the injection-side gate moves so as to go away from the mold clamping-side gate, the display unit stops at the clamping-side-gate side, a cylinder assembly of the injection unit becomes rotatable, and operations including screw replacement becomes operable. However, when closing the injection-side gate, a window of the injection-side gate approaches the display screen, and the display screen and windows of the injection-side gate and mold clamping-side gate are adjacently arranged.

Thus, when using the display unit, it is possible to arrange the display unit in the vicinity of the injection-side gate and mold clamping-side gate of the injection molding machine independently of movement the injection-side gate, without providing a mechanism for moving the display unit. Moreover, it is possible for the operator to easily confirm operations of the injection molding machine and the information indicating the operation state of the injection molding machine through the display unit.

BRIEF DESCRIPTION OF THE DRAWINGS

FIG. 8 is a top view showing the same state of the injection molding machine as FIG. 5 provided with a display unit according to the present invention.

DETAILED DESCRIPTION OF THE PREFERRED EMBODIMENTS

Figure 1:
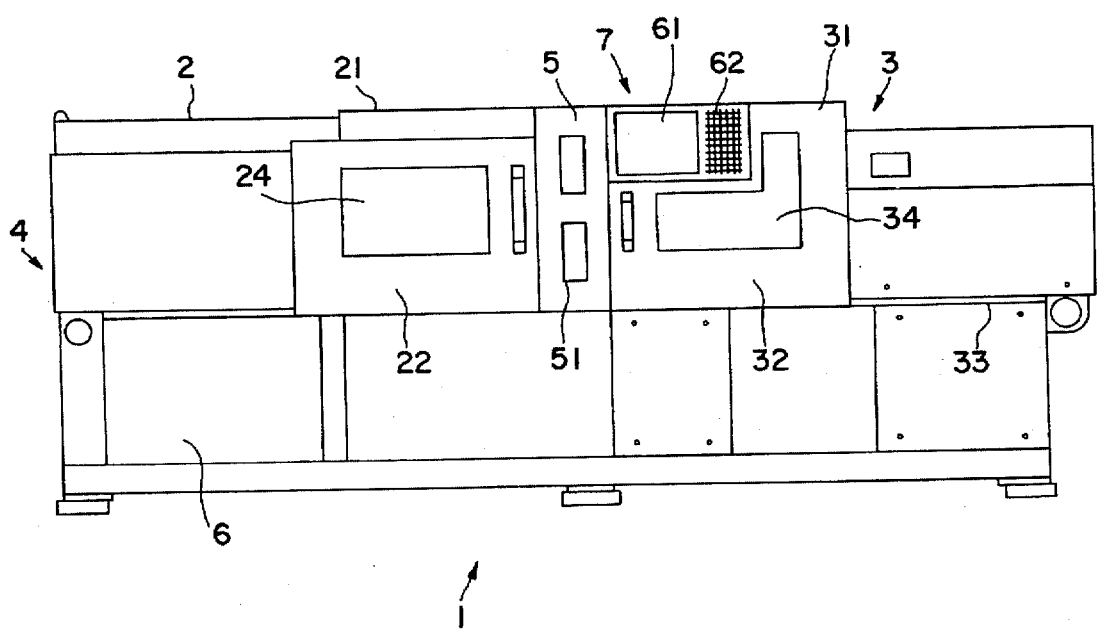
FIG. 1 is an overall front view of embodiment 1 of an injection molding machine provided with a display unit according to the present invention.

FIG. 1 is an overall front view of the embodiment 1 of the injection molding machine provided with a display unit according to the present invention. In FIG. 1, the injection molding machine 1 comprises a base 4 mode of a frame formed by combining section steels crosswise and lengthwise and welding them, a cover and its accessory structures, and a panel 8. A clamping unit 2 and an injection unit 3 are arranged crosswise at the top of upper frame and a support structure whose level can be adjusted is provided at the bottom of lower frame.

The clamping unit 2 is a unit, to which a die is attached, and is secured to the base 4. The clamping unit 2 is provided with a cover 22 for separating an operator from the unit 2, and the cover 22 constitutes a clamping-side gate 21.

In the structure shown in FIG. 1, the cover 22 having a window 24 in a portion to which a die is secured is mounted on the whole of the clamping unit 2. The cover 22 is provided with a roller unit at its upper and lower sides respectively, and the roller at the lower side is mounted on a rail secured to the top of the bottom frame of the base 4, and the roller on the upper hem is provided to be guided on top rails. The cover 22 is moved by the rollers and the rails between the clamping-side gate 21 and its front (opposite side to the injection-side gate).

The panel 8 shields the inside of the frame of the base 4, the panel 8 being formed by sheet metal working and attached to a longer frame or the like of the base by a hinge so that it can be opened and closed.

The injection unit 3 is a unit for purging resin from a die. Then, the injection unit 3 is provided with a cylinder assembly at its front and a hopper at its base, and its mechanical section comprises a front plate, a movable plate, and a rear plate. Moreover, a cover 32 is provided to separate the injection unit 3 from an operator, constituting an injection-side gate 31. Furthermore, the injection-side gate 31 is mounted on the base 4 through an extruder base 33. The extruder base 33 moves back and forth to effect and discontinue the nozzle touch operation of the injection unit 3 and moreover horizontally rotates the unit 3 about a swivel shaft installed on the base 4. The swivel shaft can be constituted with a pivot shaft.

The cover 32 is provided with a window 34 in the mechanical section of the cylinder assembly of the injection unit 3 and attached to the whole of the injection unit 3. The cover 32 can be of the same structure as the cover 22, and is provided with a roller unit at its upper and lower sides respectively. The roller unit at the lower side is mounted on the rail secured to the top of the bottom frame of the base 4, and the roller at the upper side is provided to be guided by the top rail. The cover 32 is allowed to move by the rollers and the rails between the injection-side gate 31 and its rear end. The window 34 is formed in the surface of the cover 32 by being shielded with a transparent member, and may have any shape. For example, the window 34 can be formed into an L shape including the adjacent area of the display unit 7 as shown in FIG. 1. In this case, a large area can be used for the window.

A fixed-plate cover 5 is located at the front of the rear part of the mold clamping-side gate 21 between the mold clamping-side gate 21 and the injection-side gate 31. The fixed-plate cover 5 is mounted with an operating section of a control panel 51 and the like.

The control panel 51 is a section through which various operations of an injection molding machine can be inputted. The control panel 51 enables an operator to make start, stop or emergency stop of the injection molding machine, as well as to make switching among manual, semi-automatic, and automatic operations of the injection molding machine. In the case of manual operation of the injection molding machine, for example, it is possible to individually operate various sections of the injection molding machine in either the normal or reverse direction. In the case of the die height adjustment following the replacement of dies, for example, an operator is allowed to perform operations by using a manual button, die height button, forward/backward movement button of rear platen, etc. while obtaining information for a moving rate, emergency stop, or alarm from the display unit 7.

Moreover, the injection molding machine of the present invention is provided with a display unit. The display unit is a section for displaying information for operating states of the injection molding machine. In the case of the die height adjustment after replacement of dies, for example, the display unit displays information of moving rate, emergency stop, or alarm. The display unit may be of CRT, liquid crystal display or plasma display. Among these display units, the CRT is preferable in view of the resolution, while the liquid crystal display and the plasma display are advantageous in view of space saving, since they can be formed into a thin type.

The display unit of the injection molding machine of the present invention is installed on the front of the gate of the injection molding machine 1 with its display screen facing forward. In the case of the embodiment 1 of the present invention, the display unit 7 is installed on the side of the injection-side-gate as shown in FIG. 1. The display unit 7 of the embodiment 1 is described below.

The display unit 7 of the embodiment 1 is provided with at least a display screen 61, and may be provided with input keys 62. FIG. 1 shows a case in which the display screen 61 is installed adjacently to the input keys 62. This illustration shows that the display screen 61 and the input keys 62 are part of the cover 32 of the injection-side gate 31 and located on the side of the mold clamping-side-gate 21. In the case of the illustrated display unit, the display screen 61 and input keys 62 are arranged at the upper side of the cover 32.

In the case of the cover 32 of the injection-side gate 31, it is possible to install the display screen 61 at any position. For example, as illustrated, by locating the display unit above the cover 32 and on the side of mold clamping side gate 21, it becomes possible for the display screen not only to be adjusted to the height of the operator's eyes but also to be arranged close to the window 24 on the side of the mold clamping side gate 21, thereby bringing about an effect that the checking of the mold clamping unit 2 and the display screen is made easier.

Moreover, the display screen 61 and the input keys 62 shown in FIG. 1 are arranged horizontally. In this case, the display screen 61 is installed on the side of the fixed-plate-cover 5, and the input keys 62 on the side opposite to the fixed-plate cover 5.

Furthermore, it is possible to arrange the display screen 61 and the input keys 62 by replacing their positions with each other.

The former arrangement has an effect that monitoring of the display screen and observation through the window can easily be performed as the result of locating the display screen 61 adjacently to the window 24 on the side of the mold clamping-side-gate 21 side. The latter arrangement has an effect that an input operation can easily be performed as the result of locating the input keys 62 adjacently to the control panel 51 of the fixed-plate cover 5.

Moreover, it is possible to vertically arrange the display screen 61 and the input keys 62. In the case of this vertical arrangement, it is possible for the longitudinal length of the window 34 of the injection-side gate 31 to be taken amply.

Furthermore, it is possible to arrange the input keys 62 separately from the display screen 61 at the front of the cover 32.

When the input keys 62 are arranged adjacently to the display screen 61, this produces an effect that an operator can easily perform keyboarding while viewing the display screen 61. When the input keys 62 are arranged separately from the display screen 61, this produces an effect that an operator can easily observe the state of the injection unit 3 because of the increased degree of freedom for the arrangement of the window 34.

However, the area of the window 34 on the cover 32 of the injection-side gate 31 is decreased to a certain degree by the display screen 61 and the input keys 62. However, for better observation of the injection unit 3, it is possible to adjust relative arrangement of the display unit 61, input key 62 and window 34 as described previously with respect to various cases of arrangement.

Figure 2:
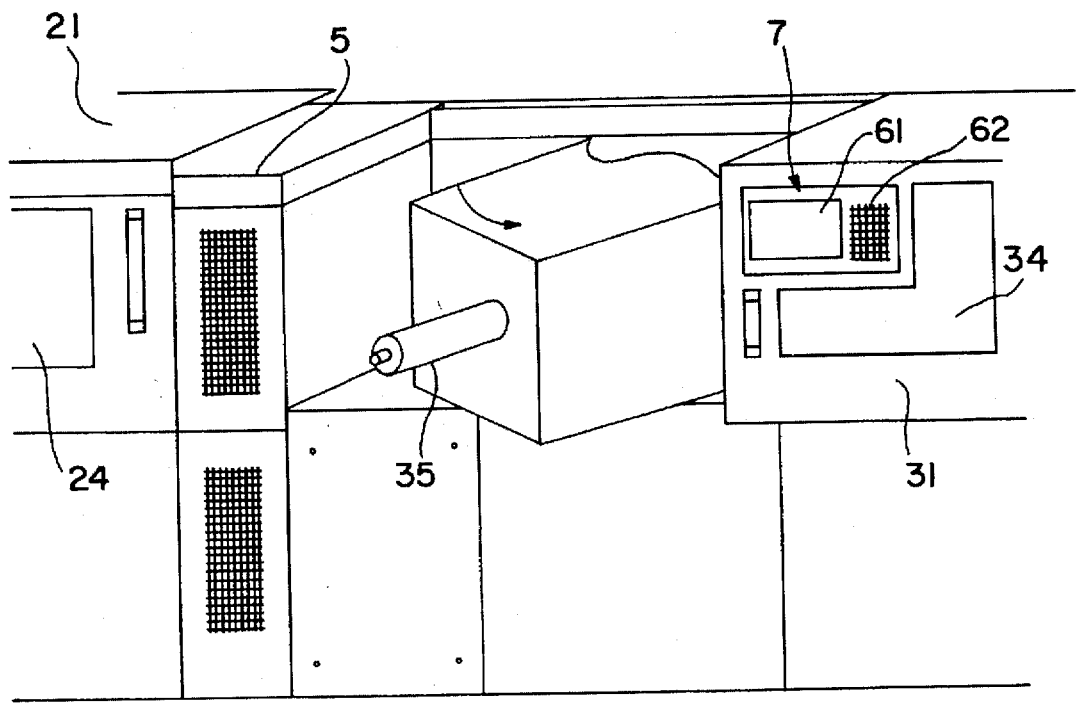
FIG. 2 is a perspective view showing the state in which the injection-side gate is opened in the embodiment 1 of the injection molding machine provided with a display unit according to the present invention.

Then, functions of the embodiment 1 of the injection molding machine provided with a display unit of the present invention will be described below referring to FIGS. 2 and 3. FIG. 2 is a perspective view showing the state in which the injection-side gate of the embodiment 1 of the injection molding machine with a display unit of the present invention is opened, and FIG. 3 is a top view showing the same state as FIG. 1.

Figure 3:
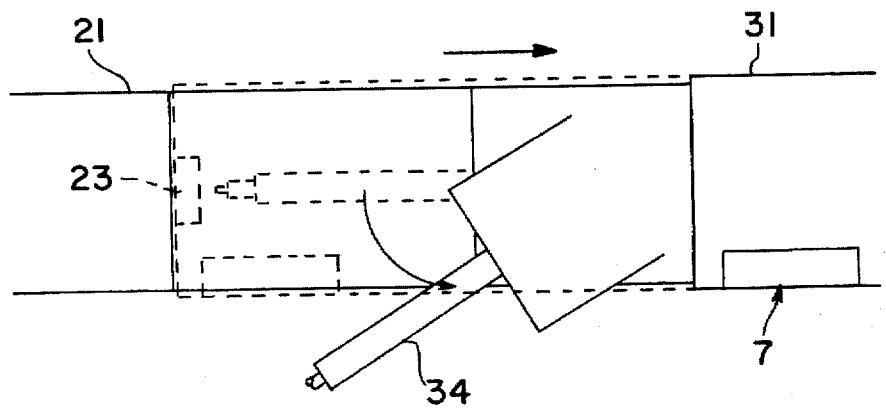
FIG. 3 is a top view showing the same state of the injection molding machine as FIG. 2 provided with a display unit according to the present invention.

FIGS. 2 and 3 show that the cover 32 forming the injection-side gate 21 is slidably supported, along its lower side, by a roller unit mounted on the rail unit laid on the upper surface of the lower frame, and, along its upper side, by a guiding roller unit mounted on the upper rail unit. Moreover, in the injection unit 3 arranged inside the cover 32, a cylinder assembly 35 for supplying resin into the die of the injection molding machine is mounted on the base 4 through the extruder base 33.

By moving the cover 32 along the guide rail so that the cover 32 goes away from the clamping-side gate 21 and the fixed-plate cover 5 by manually pulling a lever of the cover 32 or automatically pulling it by a not-illustrated automatic mechanism, the cover 32 can be brought into the open state from the closed state.

By opening the cover 32, the cylinder assembly 35 stored in the injection-side gate 31 is made to appear. In this case, the extruder base 33 moves the injection unit 3 back and forth to enables it to be connected with and disconnected from the nozzle and also enables it to horizontally rotate about the swivel shaft installed on the base 4.

For example, at the time of swiveling, releasing of the cover 32 and moving of the cylinder assembly 34 so as to go away from the mold clamping-side gate 21 in FIGS. 2 and 3 cause an open space to be formed the position of the cover 32 before its movement. Then, movement by rotation of the cylinder assembly 34 in the direction shown by an arrow to the space at least causes the front end of the assembly 34 to be drawn out from the side of injection-side-gate 31 towards the front of the injection molding machine 1, thereby making possible the replacement of the screws.

The cylinder assembly 34 with replaced screw is rotated in the direction reverse to previously described direction to be stored in the injection-side gate 31 and is moved toward the mold clamping-side-gate 21. Then, movement of the cover 32 toward the mold clamping-side gate 21 causes the injection-side gate 31 to be closed.

The display unit 7 installed on the cover 32 moved according to the movement of the cover 32. In FIG. 3, the solid line shows the state in which the cover 32 is opened, and the broken line shows the state in which the cover 32 is closed.

Therefore, when the cover 32 is opened, the display unit 7 is separate from the mold clamping-side gate However, the display unit 7 is rarely used while the cover is opened, and so no problem occurs in practical use.

Therefore, sliding movement of the cover 32 accompanies the movement of the display unit 7. Thus, it is not necessary to provide a separate mechanism for moving the display unit 7, thereby contributing to the compactness of itself. Moreover, a mechanism for securing the display unit 7 to a desired position is not necessary either.

Figure 4:
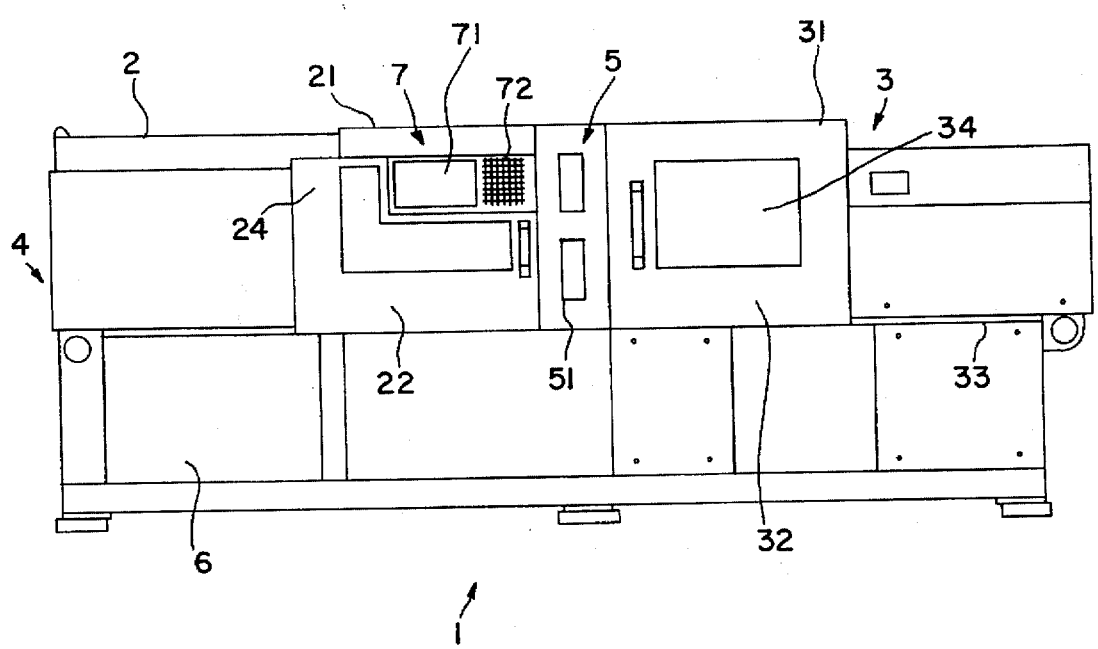
FIG. 4 is an overall front view of embodiment 2 of the injection molding machine provided with a display unit according to the present invention.

FIG. 4 is an overall front view of embodiment 2 of the injection molding machine with a display unit of the present invention. The structure of embodiment 2 of the present invention shown in FIG. 4 is the same as that of embodiment 1 except the structure of the display unit within the structures of the mold clamping-side-gate 21 of the mold clamping unit 2 side and the injection-side-gate 31 of the injection unit 3 side. Therefore, the structure of the display unit differing from that of the embodiment 1 is mainly described below, and the descriptions of other sections are omitted.

The injection molding machine 1 of embodiment 2 of the present invention comprises a mold clamping unit 2, an injection unit 3, and a fixed-plate cover 5, which are arranged laterally on a base 4. The structures of these components are almost the same as those of the embodiment 1 except the structure of the display unit 7.

The embodiment 2 of the present invention is also provided with a display unit like the case of the embodiment 1. The display unit 7 is a section for displaying information of an operation state of the injection molding machine. For example, in the case of the die height adjustment after replacement of dies, the display unit displays information of moving rate, emergency stop, or alarm. The display unit may be any of CRT, liquid crystal display, and plasma display. For the injection molding machine, the CRT provides a high resolution, while the liquid crystal display and the plasma display are advantageous in saving the space to be occupied by the display unit, since they can be formed into the thin type.

The display unit 7 of the injection molding machine of the present invention is installed on the front of the gate of the injection molding machine 1 so that its display screen faces the observer. The embodiment 2 of the present invention is installed on the mold clamping-side-gate side as shown in FIG. 4. A display unit 7 of the embodiment 2 is described below.

The display unit 7 of the embodiment 2 may be provided with at least a display screen 71 and input keys 72. The illustration in FIG. 4 shows a case of adjacently arranging the display screen 71 and the input keys 72. The display screen 71 and the input keys 72 are part of the surface of the cover 22 of the mold clamping-side gate 21 and are arranged on the side of the injection-side-gate 31. In FIG. 4, the display unit 71 and the input keys 72 are arranged on the upper part of the cover 22.

It is possible for the display screen 71 to be arranged at any position within the cover 22 of the mold clamping-side gate 21. As illustrated, arranging the screen 71 on the side of injection-side-gate 31 and at the upper part of the cover 22 produces an effect that the height of the display screen can be adjusted to that of the level of the operator's eyes, and the display screen can be arranged at a position adjacent to the window 34 of the injection-side-gate 31 side, so that the injection unit 3 and the display screen can easily be checked.

Moreover, in FIG. 4, the display screen 71 and the input keys 72 are laterally arranged, that is, the display screen 71 is arranged on the side opposite to the fixed-plate cover 5, and the input keys 72 are arranged on the side of the fixed-plate cover 5. Besides the above arrangement, it is also possible to arrange the display screen 71 and the input keys 72 by replacing their positions each other.

The former arrangement allows the input keys 72 to be arranged adjacently to the control panel 51 of the fixed-plate cover 5, while the latter arrangement allows the display screen 71 to be arranged adjacently to the window 34 of the injection-side-gate 31 side.

Moreover, it is possible to vertically arrange the display screen 71 and the input keys 72. In the case of this vertical arrangement, it is possible to adequately increase the vertical length of the window 24 of the mold clamping-side gate 21.

Furthermore, it is also possible to arrange the input keys 72 separate from the display screen 71 at the front of the cover 22 instead of the adjacent arrangement of the input keys 72 and the display screen 71. The adjacent arrangement of the input keys 72 and display screen 71 has an advantage that an operator can easily perform keyboarding while viewing the display screen 71. Arranging the input keys 72 separating from the display screen 71 has an advantage that a greater degree of freedom for the arrangement of the window 24 can be enjoyed, and the state of the mold clamping unit 2 can easily be observed.

The arrangement of display screen 71 and the input keys 72, to some extent, limits the area of the window on the cover 22 of the clamping-side gate 21. Nevertheless, the above-mentioned various arrangements allow the relative arrangement of the display screen 71, input keys 72, and window 24 to be adjusted for better view of the clamping unit 2.

Figure 5:
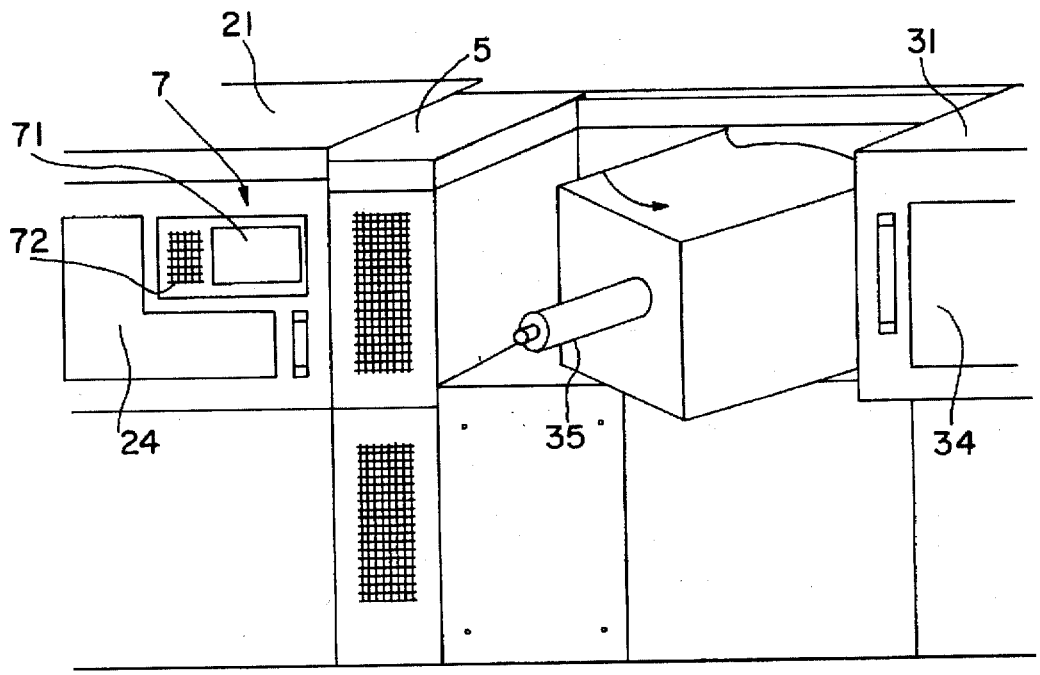
FIG. 5 is a perspective view showing the state in which the injection-side gate is opened in embodiment 2 of the injection molding machine provided with a display unit according to the present invention.

Then, functions of the embodiment of the injection molding machine provided with the display unit of the present invention are described below referring to FIGS. 5 and 6. FIG. 5 is a perspective view showing the opened state of the injection-side gate in the embodiment 2 of the injection molding machine provided with the display unit of the present invention, and FIG. 6 is a top view showing the same state.

Figure 6:
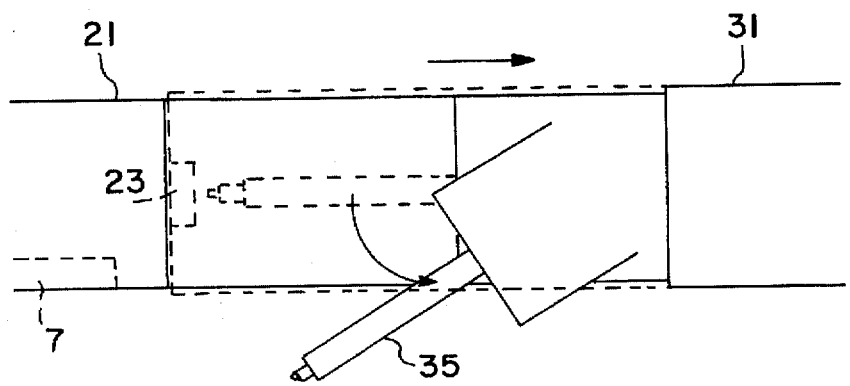

In FIGS. 5 and 6, operations of the cover 32 of the injection-side gate 31 and operations of the cylinder assembly 34 are the same as those of the embodiment 1, and so operations of the cover and the like of the injection-side gate are briefly described below.

Manual operation using a lever installed on the cover 32 or automatic operation using a not-illustrated mechanism horizontally moves the cover 32 to the side opposite to the mold clamping-side gate 21, and the stare of the cover 32 changes from the closed state shown in FIG. 4 to the opened state shown in FIG. 5.

Opening the cover 32 causes the cylinder assembly 35 to appear from the injection-side gate 31. Then, the extruder base 33 brings the injection unit 3 to a position where the injection unit 3 is allowed to move back and forth for being connected to and disconnected from the nozzle, and moreover enables the injection unit 3 to rotate horizontally about the swivel shaft mounted on the base 4.

For example, at the time of swiveling, a space is formed when the cover 32 is opened, and the cylinder assembly 38 in FIG. 5 is moved in the direction for going away from the mold clamping-side gate 21. Then, rotation of the cylinder assembly 35 in the direction of the arrow at least causes the front end of the assembly to be drawn out towards the front of the injection molding machine 1 from the injection-side-gate 31 side and makes a screw ready for replacement.

The cylinder assembly 35 with replaced screw rotates in the direction opposite to the previously described direction to be stored in the injection side gate moves towards the mold clamping side gate 21, and then moves the cover 32 towards the mold clamping side gate to close the injection side gate 31.

In these operations, arranging the clamping-side gate 21 on the cover 22 side makes the display unit 7 unrelated to the movement of the cover 32 of the injection-side gate 31.

In FIGS. 5 and 6, the solid line represent the state in which the cover 32 is opened, and the broken line represent the state in which it is closed.

Therefore, the display unit 7 is located on the side of the clamping-side-gate 21 regardless of whether the cover 32 is opened or closed, and it is possible to keep the display unit 7 at the same position with its display screen facing forward even during screw replacement operation. Therefore, no problem occurs in operating the injection molding machine.

Thus, it is unnecessary to provide a mechanism for moving the display unit, so that the display unit can be reduced in size. Moreover, a mechanism for fixing the display unit is not necessary either.

As described above, the embodiments 1 and 2 indicate that the injection molding machine provided with the display unit of the present invention has the following effects.

Even a display unit with a large display screen can be installed on the cover of the clamping-side gate or injection-side gate, so that both the gates and the display screen can simultaneously be observed and monitored.

The injection molding machine does not hinder the movement of the cylinder assembly even when the cylinder assembly has to be rotated for operation such as the replacement of the screw, and does not need mechanisms for its own moving and fixing.

In the above embodiments, a structure is shown in which the fixed-plate cover is arranged between the clamping-side gate and the injection-side gate. However, the present invention is not restricted to the above structure, and so it is optional whether to provide or not to provide the fixed-plate cover and where it is to be installed.

As a mode of installation of a display unit on a gate, it is possible to install the display unit on the cover of an injection-side gate.

As another mode of installation of a display unit on a gate, it is possible to install the display unit on the cover of an mold clamping-side gate.

Further, as a mode about a position of installation of the display unit of the present invention on the cover of an injection-side gate, there are one in which the display unit may be installed on the mold clamping-side-gate side, and the other in which the display unit may be installed on the opposite side of a mold clamping-side-gate side.

Furthermore, as a mode about a position of installation of the display unit of the present invention on the cover of a mold clamping-side gate, there are one in which the display unit is installed on the injection-side-gate side, and the other in which the display unit is installed on the side opposite side of the injection-side-gate side.

Furthermore, as still another mode, there is on in which display unit is installed adjacently to input means. In still another mode, the display unit is installed separately from the input means.

As described above, the present invention is capable of providing an injection molding machine including an easy-to-operate and space-saving display unit.

What is claimed is:

1. An injection molding machine, comprising:
   a mold clamping unit;
   an injection unit arranged laterally with said mold clamping unit; and
   a display unit installed on an injection-side gate, said injection-side gate enclosing said injection unit, the display unit being movable as the injection-side gate is opened or closed, so as to allow an operator to simultaneously observe both said injection-side gate and said display unit.

2. The injection molding machine according to claim 1, wherein the display unit is provided with a display screen.

3. The injection molding machine according to claim 1, wherein the display unit includes a display screen and an input device.

4. The injection molding machine according to claim 1, wherein the display unit is installed on a mold clamping unit side of said injection-side gate.

5. The injection molding machine according to claim 1, wherein the display unit includes a display screen and an input device.

6. An injection molding machine, comprising:
   a mold clamping unit;
   an injection unit arranged laterally with said mold clamping unit; and
   a display unit installed on a mold clamping-side gate, said mold-clamping-side gate enclosing the mold clamping unit, the display unit being movable as the mold clamping-side gate is opened or closed, so as to allow an operator to simultaneously observe both said mold clamping-side gate and said display unit.

7. The injection molding machine according to claim 6, wherein the display unit is provided with a display screen.

8. The injection molding machine provided with a display unit according to claim 6, wherein the display unit is installed on an injection unit side on said mold clamping-side gate.

* * * * *

UNITED STATES PATENT AND TRADEMARK OFFICE
CERTIFICATE OF CORRECTION

PATENT NO. : 5,670,186
DATED : September 23, 1997
INVENTOR(S) : Koichi NISHIMURA, et al.

It is certified that error appears in the above-indentified patent and that said Letters Patent is hereby corrected as shown below:

On the title page:

Item [54], Title, change "INJECTION MOLDING MACHINE PROVIDED MOLDING WITH A DISPLAY UNIT" to --INJECTION MOLDING MACHINE PROVIDED WITH A DISPLAY UNIT--.

Col. 1, line 2, delete "MOLDING";
line 31, change "83" to --63--.
Col. 3, line 42, change "FIG. 8" to --FIG. 6--;
line 55, change "8" to --6--.
Col. 4, line 6, change "8" to --6--;
line 7, change "8" to --6--.
Col. 8, line 49, change "38" to --35--;
line 58, after "gate"" insert a --31,-- ;
line 60, after "gate" insert a --21--.

Signed and Sealed this

Second Day of December,1997

Attest:

BRUCE LEHMAN

Attesting Officer

Commissioner of Patents and Trademarks